United States Patent
Lindner et al.

[15] 3,674,866
[45] July 4, 1972

[54] MOENOMYCIN AND PROCESS FOR PRODUCING SAME

[72] Inventors: Fritz Lindner; Karl Heinz Wallhäusser, both of Hofheim/Taunus; Gerhard Huber, Frankfurt/Main, all of Germany

[73] Assignee: Farbwerke Hoechst Aktiengesellschaft vormals Meister Lucius & Bruning, Frankfurt/Main, Germany

[22] Filed: Sept. 1, 1964

[21] Appl. No.: 393,760

Related U.S. Application Data

[63] Continuation-in-part of Ser. No. 216,751, Aug. 14, 1962, abandoned, which is a continuation-in-part of Ser. No. 87,750, Feb. 8, 1961, abandoned.

[30] Foreign Application Priority Data

Feb. 10, 1960 Germany............................F 30,506

[52] U.S. Cl..............................................424/118, 195/80
[51] Int. Cl. ........................................................A61k 21/00

[58] Field of Search..................167/65 AB; 195/80; 424/118

[56] References Cited

OTHER PUBLICATIONS

Miller, The Pfizer Handbood of Microbiac Metabolites, McGraw-Hill Book Co., Inc., N.Y., N.Y., 1961, page 594.

*Primary Examiner*—Jerome D. Goldberg
*Attorney*—Curtis, Morris & Safford

[57] ABSTRACT

A high molecular weight amorphous polysaccharide antibiotic composition containing about 1.9 percent by weight phosphorus, 48.5 percent carbon, 7.3 percent hydrogen, 5.1 percent nitrogen and the balance oxygen; having a molecular weight of 68,000 to 70,000, infra-red absorption spectrum maxima, for the sodium salt at 2.95, 3.40, 6.00, 6.53, 7.28, 8.20 and 9.38 $\mu$ and activity in vitro and in vivo against gram positive micro-organisms; and process of preparing same by cultivation of *S. bambergiensis*, *S. ghanaensis*, *S. ederensis* or *S. geysiriensis*.

8 Claims, No Drawings

MOENOMYCIN AND PROCESS FOR PRODUCING SAME

The present application is a continuation-in-part of application Ser. No. 216,751 filed Aug. 14, 1962, now abandoned, which, in turn, is a continuation-in-part of Application Ser. No. 87,750 filed Feb. 8, 1961, now abandoned.

The invention relates to a new antibiotic called Moenomycin, and to a process of preparing it.

This new antibiotic is prepared from the culture of Streptomyces bambergiensis ATCC No. 13,879 which has a certain similarity with Streptomyces glaucus, Streptomyces prasinus and Streptomyces hirsutus which form green spores, but differs from these as shown in Table 1 forming part of this application. While Streptomyces glaucus clearly belongs to the spira group (3–5 spirals) as regards the type of sporophores, one spiral only can be found in Streptomyces bambergiensis so that this organism is to be ranged in the Retinaculum apertum group. There are other differences with regard to the pigment formation and color of the vegetative mycelium. Streptomyces prasinus (Ettlinger et al.) probably belongs to the Retinaculum apertum group, too. Owing to its copperred vegatative mycelium on calcium-malate-agar, the lacking liquefaction of gelatin and formation of antibiotics, however, this type is also distinguished from Streptomyces bambergiensis. Like the afore-mentioned organism, Streptomyces hirsutus (Ettlinger et al.) is also not able to produce antibiotics.

It belongs to the spira-group, it does not show casein degradation (peptonization of milk) and decolorizes litmus paper. Since Streptomyces bambergiensis ATCC No. 13,879 is not identical with one of the types described in Bergey's Manual of Determinative Bacteriology, 6th edition (1948) and in the Code of Determination by N.Y. Krassilnikow, Moscow (1949), it was called Streptomyces bambergiensis owing to its origin from a soil sample taken near Bamberg.

There could be isolated further streptomyces which form the same antibiotic viz. Streptomyces ghanaensis ATCC No. 14,672 (from Ghana) which in its properties resembles Streptomyces bambergiensis, as well as Streptomyces ederensis ATCC No. 15,304 (from the Eder valley) and Streptomyces geysiriensis ATCC No. 15,303 (from an Iceland geyser). The aforementioned streptomyces are compared in Table 2 of this application, said table showing the morphological and physiological properties of these organisms.

The new antibiotic Moenomycin may be obtained by cultivating in an appropriate manner a Streptomyces bambergiensis strain or other equivalent Streptomyces such, for example, as Streptomyces ghanaensis, Streptomyces ederensis, Streptomyces geysiriensis or the variants or mutants thereof, and isolating the antibiotic from the mycelium and culture solution.

The cultivation takes place under aerobic conditions in an aqueous medium containing, in addition to organic salts, starch, glucose, cane sugar or molasses as source of carbon, as well as soybean groats, cornsteep liquor, yeast extract, cotton seed meal, nitrates or ammonium salts as a source of nitrogen, until a maximum antibiotic activity is reached which is proven in the test against Staphylococcus aureus P 209.

The antibiotic is present mainly in the mycelium. Small amounts, however, are present in the culture solution from where they are obtained by extraction with organic solvents such, for example, as butanol, or with the aid of adsorbing agents.

To recover the antibiotic from the mycelium, the latter is separated from the culture solution in an appropriate manner, e.g. by centrifugation, and extracted with an organic solvent. There are preferably used completely miscible or at least partially, i.e., to a degree of about 5 percent miscible solvents such as, for example, alcohols, e.g. methanol, ethanol, butanol; partially etherified alcohols, e.g. ethylene glycol monomethyl ether; ethers, e.g. dioxane; and ketones, e.g. acetone. The extraction can also be carried out by destruction of the cells, for example, by deep-freezing and subsequent thawing, or by homogenizing, with water or aqueous solutions of salts, organic or inorganic acids.

The crude antibiotic can be recovered from the mycelium extracts by evaporating the solvents, preferably under reduced pressure. To separate the resulting residue from inactive impurities, it is extracted by means of a hot polar organic solvent such, for example, as methanol, and the antibiotic is precipitated from the extract and concentrated under reduced pressure with a nonpolar organic solvent such, for example, as diethyl ether, diisopropyl ether or ethyl acetate.

The isolation from the mycelium extract can also be carried out by evaporating the organic solvent, adjusting the pH to a value ranging from 1–5, preferably from 2–3, with the aid of a mineral acid and then extracting the antibiotic from the remaining aqueous residue with a solvent which is not miscible with water, or is only scarcely miscible with water such, for example, as n-butanol. The antibiotic can also be adsorbed in known manner from the aqueous residue by adsorbing agents such, for example, as bleaching earths. The elution is suitably effected by means of mixtures of water and organic solvents such, for example, as mixtures of methanol and water, methyl glycol and water or pyrimidine and water, the water content of which may range between 30 and 70 percent, and is preferably of the order of about 50 percent. The crude antibiotic is obtainable from the extract by evaporation and precipitation as described above.

The crude material thus obtained can be purified in different ways, for instance, by column chromatography on inorganic adsorbents such, for example, as magnesium silicate (FLORISIL magnesium silicate), charcoal or bleaching earths, by gel filtration on cross-linked dextrans showing microfiltering properties, as they are commercially obtainable under the names of SEPHADEX dextrans G 25, G 50 and G 100; or by separation on anion exchange cellulose, such, for example, as ECTEOLA-cellulose and DEAE-cellulose. The material can furthermore be concentrated by salting it out from a concentrated aqueous solution, for instance, by saturation with ammonium sulfate or by dialysis. In the latter case the antibiotic does not pass through the dialysis membrane. The last-mentioned properties are indicative of the high-molecular weight structure of the antibiotic.

Moenomycin can be further purified by counter-current distribution or by partition-chromatography on suitable adsorbing agents such as kieselguhr, for which procedure the n-butanol/citrate-phosphate-buffer of pH 4 (Mc.Ilvaire buffer) is, for example, particularly suitable.

The new antibiotic which is distinguished by its properties from the antibiotically effective substances hitherto described in the literature constitutes an amorphous, colorless weak acid that forms the corresponding salt when reacted with one mol of a metal hydroxide or an organic base. Thus, alkali metal salts, alkaline earth metal salts and salts of other metals, e.g. aluminum and zinc, as well as salts of organic bases, particularly nitrogen bases, have been synthesized.

The antibiotic, whether in the form of the acid or in the form of the salts mentioned above, particularly its alkali metal salts, is soluble in water, alcohols of low molecular weight, e.g. methanol, in formamide and dimethyl formamide; it is less soluble in alcohols of two or more carbon atoms, such as ethanol, n-propanol and n-butanol as well as in pyrimidine; it is slightly soluble in ether and ethyl acetate, and it is insoluble in nonpolar organic solvents, such as benzene and chloroform.

The substance is stable in neutral aqueous and methanolic solution. It is slowly decomposed, however, in acid and in alkaline solutions. The sodium salt of Moenomycin in dry solid form is stable for at least 48 hours at 80° C.

Upon careful analysis the acid form of the antibiotic was found to contain:

C 48.5 % by weight
H 7.3 % by weight
N 5.1 % by weight
P 1.8 % by weight
O remainder It has no definite melting point, decomposition starting at 200° C and has maximum absorption in the infra-red spectrum at 2.95, 3.41, 5.81, 6.13, 6.45, 7.28, 7.53, 8.22, 9,50 and 10.30 μ. The corresponding values of the maximum absorption of the sodium salt are at 2.95, 3.40, 6.00, 6.53, 7.28, 8.10, 9.38 μ.

It shows no migration in paper-electrophoresis in buffer solutions of pH 1.9 and 7.8, but shows an easy anodic migration at pH 9.8. The $R_F$ values of the antibiotic in paper chromatography are as follows:

| System | $R_f$ |
|---|---|
| n-butanol/triethanolamine/methyl-isobutylketone/water 14:1:1:5 | 0.05 |
| benzene/glacial acetic acid/water 2:2:1 | 0 |
| n-butanol/glacial acetic acid/water 4:1:5 | 0.88 |
| t-butanol/glacial acetic acid/water 60:6:34 | 0.70 |
| butanol saturated with water | 0 |
| sec.butanol/glacial acetic acid/water 4:1:1 | 0.05 |

The following reactions are negative : ninhydrine, biuret, Fehling, Ehrlich, Sakaguchi, aniline phthalate, ferric chloride. Moenomycin gives with antimony trichloride and chlorosulfonic acid (as spray reagents) a red-violet color reaction and reacts with potassium permanganate and periodic acid/Schiff reagent.

Potentiometric titration shows an equivalent weight of about 800 and a $P_K$-value of 4.1. Determination of the molecular weight by means of an ultracentrifuge and measurement of the light dispersion gives a value of 68,000 to 70,000. Moenomycin is not dialyzable and can be salted out from aqueous solutions with neutral salts, for example, ammonium sulfate.

The maximum absorption in the ultraviolet within the range of from 220–400 mμ is at 258 mμ, $E_{1\ cm}^{1\ \%}$ in water at a pH-value of 7 being 60. The optical activity of Moenomycin is $[\alpha]_{22}^{D} = +4°$.

Hydrolysis with 2N-hydrochloric acid (3 hours, 100° C) provokes in the paper chromatograph (n-butanol/pyridine/water 4:3:2 system) at least 5 ninhydrin-positive spots, which, moreover, reduce alkaline silver nitrate solution and must be considered as amino sugars. One of these spots was correlated to glucosamine. Moreover, some neutral sugars are formed. Of these glucose was hitherto identified. With alkaline hydrolysis (0.1 N-sodium hydroxide solution, 1 hour, 100° C) a mixture of phosphoric acid esters (sugar phosphates or aminosugar phosphates) is formed.

With short-time acid hydrolysis (normal hydrochloric acid, 15 minutes, 100° C) a lipoidlike substance separates which can be isolated by extraction with chloroform of ether. Moenomycin is not attacked by the following enzymes: trypsin, papain, pepsin, amylase, hemi-cellulase, lysozyme, phosphorus diesterase (snake venom), alkaline phosphatase, hyaluronidase, n-acetyl-glucosaminidase, ribo- and desoxyribonuclease.

On the basis of these properties and in view of the fact that it is not dialyzable and can be salted out, Moenomycin can be considered as an acid polysaccharide of high molecular weight containing phosphate ester groups and a lipoid portion. The carbohydrate part consists of neutral and amino-sugars.

Unlike high molecular weight, phosphorus-containing antibiotics heretofore proposed, e.g. hekenin (from *Penicillium funiculosum*) which is an unstable nucleoproteide, and statolon (from *Penicillium stoloniferum*) which contains arabinose, galactose and galactosamine as structural units, and both of which are active exclusively on viruses, Moenomycin does not show anti-virus activity, is extraordinarily stable and does not contain protein, nucleic acid, or arabinose, galactose or galactosamine units.

Moenomycin is very well tolerated by warm-blooded animals. The $LD_{50}$ in mice for oral, subcutaneous or intraperitoneal administration is >2,000 mg/kg; in intravenous administration the $LD_{50}$ in mice is 1,400 mg/kg. The new antibiotic possesses a high activity in vitro and in vivo against gram-positive micro-organism, especially against staphylococci resistant to tetracycline, penicillin, streptomycin, novobiocin and erythromycin. Table 3 shows the biological activity. When administered subcutaneously three times in amounts of 2 milligrams/kg each, the antibiotic affords a 100 percent protection in the mouse infected with Streptococci haemolytici, as shown in Table 4.

In therapeutic tests on mice infected with tetracycline-resistant staphylococci, it affords a 100 percent protection when administered in a single dose of 4 mg/kg i.p. In the subcutaneous disinfection test according to Fussgänger and Rolly (Arzneimittelforschung 6, 260, (1966)), a dose of 1–2 mg/20 g of body weight of a mouse causes inhibition of the growth of the tetracycline-resistant staphylococci.

Though Moenomycin has a low activity in vitro against Brucellae, a good activity in vivo was observed in mice infected with brucellosis. Upon intravenous injection of 0.75 mg/20 g of mouse, 90 percent of the mice survived an intraperitoneal infection with *Brucellae abortus*, whereas of the control animals which were equally infected and were given the same dose of streptomycin, only 60 percent survived. The same effect (90 percent of surviving mice) was attained, when the Moenomycin was administered subcutaneously in a dose of 1 mg/20 g of mouse 24 hours prior to the infection.

The following examples illustrate the invention, but they are not intended to limit it thereto, the percentages being by weight.

EXAMPLE 1

A. Preparation of the inoculation material

80 Milliliters of the nutrient solution described below is introduced into a 300-ml Erlenmeyer flask, the solution is adjusted to pH 6.6, sterilized for 30 minutes at 121° C in the autoclave and, after cooling, inoculated with a spore suspension of *Streptomyces Bambergiensis* ATCC No. 13,879 obtained by floating off the spores from a culture on a nutrient medium consisting of cats and agar in a Roux flask.

Nutrient solution containing

| soybean meal | | 1 % |
|---|---|---|
| | glucose | 1 % |
| NaCl | | 0.25 % |

The inoculated nutrient solution in the flask is cultivated for 48 hours in a shaking apparatus at 28° C and then used for inoculation of the fermenter both described below.

B. Fermentation

The cultivation on a larger scale is effected in a fermenter with a nutrient solution containing

| Starch sugar | 4 % |
|---|---|
| Soybean groats | 3.4 % |
| NaCl | 0.25 % |

50 liters of this nutrient solution are sterilized for 30 minutes at 121° C in a 100-liter fermenter, then cooled to 28° C and seeded with 1–2 percent of the inoculum obtained as described in Part A. The organisms are grown with aeration (50 liters of air per 1 liter of liquid per hour). During the first 48 hours, the pH value falls from 6.8 to about 6.0 – 6.2, and then rises slowly to 7.5 – 8.0 (96 – 120 hours).

C. Isolation

Upon harvesting, the mycelium is separated from the fermentation solution by centrifugation and extracted while stirred, with 10 liters of methanol. The methanol is filtered off and the residue is again extracted with 10 liters of methanol. The combined methanol extracts are evaporated under reduced pressure until the methanol is removed and the aqueous phase obtained (about 500 milliliters) is adjusted twice by means of hydrochloric acid to a pH of 3, and extracted with 500 milliliters of butanol each time. The butanol extract is evaporated under reduced pressure to 100 milliliters. On standing in a refrigerator, crude Moenomycin separates. The product is filtered off with suction, washed with ethyl-acetate and dried. The yield is 18 grams. The crude product can be obtained from the concentrated butanol solution likewise by precipitation with ether or ethyl-acetate. The product contains about 20 percent of Meonomycin (microbiological test).

D. Purification by dialysis and chromatography on magnesium silicate 20 grams of the crude product prepared as described in Part C are suspended in 200 milliliters of water, the solution is adjusted to a pH of 7 by means of normal sodium hydroxide solution, any undissolved matter is filtered off and the mass is dialyzed for three days against running tap water. The solution remaining in the dialysis vessel is adjusted to a pH of 3 by means of hydrochloric acid extracted twice with 250 milliliters of normal butanol each time. After concentration of the butanol under reduced pressure the enriched Moenomycin is obtained as described in Part C by freezing it out or by precipitation with ether. The yield is 8.5 grams. The brown product, of 20 percent strength, contains 48 percent of Moenomycin.

In order to remove the major part of the brown dyestuff contained in the crude Moenomycin, the crude product is dissolved in 100 milliliters of methanol, any undissolved matter is filtered off and the solution is brought on a chromatography column with 80 grams of magnesium trisilicate (FLORISIL) suspended in methanol. The elution takes place with 1 liter of methanol (fraction 1) and 500 milliliters of aqueous methanol of 80 percent strength (fraction 2). Upon elimination of the solvent by evaporation, fraction 1 yields 5.4 grams of Moenomycin in the form of a light amorphous powder, and fraction 2 yields 1.3 gram of Moenomycin of a slightly reduced activity.

E. Purification by gel-filtration on SEPHADEX 1 gram of Moenomycin obtained as described in Part D is dissolved in 10 milliliters of water and applied on a chromatography column (80 × 5 cm) containing swollen SEPHADEX. On development with water, 16 fractions of 100 milliliters each are collected and analyzed. According to ultraviolet measurement at 258 mμ and determination of the microbiological activity, Moenomycin is present in Fractions 5 to 10 (maximum in Fraction 8), whereas dyestuffs appear in Fraction 4 and in Fractions 11 to 16. A colorless amorphous product (0.55 gram) showing a Moenomycin conten of 80–85 percent is obtained from Fraction 8 by lyophilization.

F. Purification by chromatography at ion-exchange cellulose 400 milligrams of the Moenomycin purified by gel filtration according to Part E are dissolved in 8 milliliters of water and applied to a chromatography column (100 × 3 cm) with EC-TOELA anion exchange cellulose. The ECTEOLA powder was previously converted into the bicarbonate form by means of an aqueous $NH_4HCO_3$-solution of 5 percent strength and is suspended in the column by means of $NH_4HCO_3$-solution of 4 percent strength. The column is developed by means of water (100 ml) and subsequently by a gradient elution (linear gradient) with 1 liter each of $NH_4HCO_3$-solution of 0.4 and 10 percent strength, respectively. Fractions of 10 milliliters each are collected and analyzed by ultraviolet measurement (258 mμ) and microbiological tests. Moenomycin is present in Fractions 81 to 110. The fractions are combined, the solution is stirred with an excess of AMBERLITE IRC–50 and freed from salt in this manner. By lyophilization of the solution, 180 milligrams of pure, colorless Moenomycin (acid form) are obtained.

G. Purification by means of the zinc salt 5 grams of crude Moenomycin prepared as described in Part C are dissolved in 100 milliliters of water while neutralized to a pH of 7. After separation of the insoluble portion, 100 milliliters of a $ZnSO_4$-solution of 10 percent strength are added and the solution is adjusted to a pH of 8 by means of normal sodium hydroxide solution. The precipitated zinc salts containing the Moenomycin are removed by centrifugation, washed out with 100 milliliters of water and suspended in 100 milliliters of water. After acidification to a pH of 2 by means of 1N-sulfuric acid, the clear solution is extracted twice by means of 100 milliliters of n-butanol each, the butanol extracts are combined, concentrated and the Moenomycin is isolated by precipitation with ethyl-acetate. The yield is 1.9 grams, Moenomycin content 45 percent.

H. Potassium salt of Meonomycin 0.5 gram of pure Moenomycin (acid form, obtained as described in Part F) is dissolved in 5 milliliter of water and the solution is adjusted to a pH by means of 0.5-potassium hydroxide solution. By lyphilization 0.52 gram of the potassium salt of Moenomycin is obtained.

I. Sodium salt of Moenomycin 300 milligrams of pure Moenomycin (acid form, obtained as described in Part F) are dissolved in 1 milliliter of methanol, the solution is adjusted to a pH of 7 by means of methanolic sodium hydroxide solution and the sodium salt is precipitated by addition of ether, washed with water and dried under reduced pressure. The yield is 240 milligrams.

K. Diethylamine salt of Moenomycin 250 milligrams of pure Moenomycin (acid form, obtained according to Part F) are dissolved in 3 milliliters of water and 2 milliliters of an aqueous diethylamine solution of 50 percent strength are added. The diethylamine salt of the Moenomycin formed is isolated by evaporation of the solution under reduced pressure.

L. Cyclohexylamine salt of Moenomycin

To a solution of 450 milligrams of pure Moenomycin in 10 milliliters of methanol 300 milligrams of cyclohexylamine are added and the salt that has formed is isolated by evaporation of the solution under reduced pressure.

EXAMPLE 2

A. Preparation of the inoculum 100 cc of a nutrient solution consisting of 1 percent glucose, 1 percent of casein peptone, 0.2 percent of beef broth and 0.25 percent of NaCl, pH = 7.0, in an Erlenmeyer flask of 300 cc capacity, are innoculated with spores of a soil culture of the strain *Streptomyces ghanaensis*, ATCC No. 14,672, and shaken for 48 hours at 28° C. This culture serves as inoculum for the fermentation.

B. Fermentation

Fermentation is effected with 10 l of a nutrient solution having the following composition:

3 percent starch sugar (glucose)
1 percent coarse grain soybean flour
1 percent cornsteep liquor
0.2 percent oat flakes
0.5 percent $CaCO_3$
0.2 percent $KNO_3$
0.02 percent zinc sulfate
pH = 7.5.

After having sterilized this nutrient solution, 300 cc of the inoculum prepared as described in Part A are added to the above solution and fermentation is allowed to proceed at 32°–35 C, while stirring and aerating well. During the fermentation, 100–250 cc of sperm oil are added as an antifoaming agent. When the optimum activity is reached (after 72–120 hours) the product is collected from the batch and isolated as described in Example 1.

TABLE 1

[Comparison of Streptomyces forming green spores as described in the literature]

| Characteristics | S. bamberg. ATCC. No 13 879 | S. virido-chrom* | S. glaucus* | S. viridans* | S. alboviridis* | S. prasinus** | S. hirsutus** | S. prasino-pilosis* |
|---|---|---|---|---|---|---|---|---|
| Sporophore | Retinaculum ap. | Spira (bis 10) | Spira (3–5) | Spira (5–12) | Spira (3–4) | Spira R. apert (1–2). | Spira (3) | Spira (1–3). |
| Shape of spores | Oval, hairy | Oval, thorny | Oval | Cylindrical | Cylindrical | Oblong-oval thorny. | Oval, thorny | Oval, hairy. |

TABLE 1

[Comparison of Streptomyces forming green spores as described in the literature]

| Characteristics | S. bamberg. ATCC. No 13 879 | S. virido-chrom* | S. glaucus* | S. viridans* | S. alboviridis* | S. prasinus** | S. hirsutus** | S. prasino-pilosis* |
|---|---|---|---|---|---|---|---|---|
| Color of spores | Green-dark green. | Light green, grey green, smoke blue. | Green-grey | Dark grey-grey green. | Greenish-grey | Green-dark green. | Dark green | Dark Green. |
| Vegetative mycelium | Cream-light brown. | Green brown | Colorless | Green brown | Green-brown | Light brown | Colorless-white yellow. | Brick-red. |
| Soluble pigment | − | Brown | Brown | Brown | Green | − | | |
| Melanine pigment | − | + | + | | | − | | |
| Starch hydrolysis | +++ | + | ++++ | + | | ++++ | + | −. |
| Casein hydrolysis | +(weak) | + | + | + | | +(slow) | + | +. |
| Gelatin degradation | + | +(slow) | + | +++ | +(slow) | − | +(slow) | ++. |
| Nitrate reduction | ++++ | + | ++. | + | | − | +(slow) | +(slow). |
| Litmus | Blue | Blue | | | | | | |
| Ca-malate-agar (color of the vegetat. mycelium) | Cream | | | | | Blue Copper-red | Colorless White | Red. Brick-red. |
| Antibiotic efficacy | Present | Lacking or weak. | Present | None | | None | None | Weak against gram-positive Bacteriae. |

*According to N. A. Krassilnikow.
**According to Ettlinger et al.

TABLE 2

[Morphological and physiological properties of new Streptomyces]

| Culture medium | Properties | S. ederensis ATCC No. 15 304 | S. bambergiensis ATCC No. 13 879 | S. geysiriensis ATCC No. 15 303 | S. ghanaensis ATCC No. 14 672 |
|---|---|---|---|---|---|
| Bouillon-gelatin | Growth veg | +++ | +++ | +++ | ++. |
| | Mycelium | Dark brown | Cream | Cream | Cream. |
| | Aerial mycelium and spores | Weakly white | White | White | White. |
| | Soluble pigment | Dark brown | − | − | −. |
| | Liquefaction | ++ | ++ | ++ | +. |
| Starch-agar | Growth veg | ++ | +++ | +++ | ++. |
| | Mycelium | Grey-brown | Cream | White | White. |
| | Aerial mycelium and spores | None | Green | Light-grey | Green. |
| | Sol. pigment | Brownish | − | − | −. |
| | Starch degradat | ++++ K:Z=20:62 | +++ K:Z=22:53 | ++ K:Z=25:31 | + K:Z=25:25. |
| Glucose-agar | Growth veg | +++ | ++ | +++ | +++. |
| | Mycelium | Brown | Cream | Yellow | Yellow brown. |
| | Aerial mycelium and spores | Grey-white | White | Light grey (lanata) | White. |
| | Sol. pigment | Dark brown | − | − | −. |
| Synthetic agar | Growth veg | ++ | +++ | +++ | +++. |
| | Mycelium | Light brown | Light brown | Light brown | Light brown. |
| | Aerial mycelium and spores | None | Pale brown | Light grey | White. |
| | Sol. pigment | Light brown | Light brown | Pale yellow | −. |
| | Nitrate reduct | − | ++++ | − | −. |
| Ca-malate-agar | Growth veg | +++ | ++ | +++ | +++. |
| | Mycelium | Dark brown | Cream | Yellow-brown | Yellow-cream. |
| | Aerial mycelium and spores | Grey brown | Green | White | Brownish white. |
| | Sol. pigment | Dark brown | − | − | −. |
| | Malate degrad | + (under the colony) | + K:Z=23:29 | + K:Z=23:26 | −. |
| Glucose aspartic agar | Growth veg | +++ | +++ | +++ | +++. |
| | Mycelium | Brown | Cream | Yellow-cream | Yellow-cream. |
| | Aerial mycelium and spores | None | Green | Light grey | Green. |
| | Sol. pigment | Dark brown | − | − | −. |
| Nutrient agar | Growth veg | +++ | +++ | +++ | ++++. |
| | Mycelium | Dark brown | Cream | Cream | Cream. |
| | Aerial mycelium and spores | None | White | Light grey | White green. |
| | Sol. pigment | Dark brown | − | − | −. |
| Emerson agar | Growth veg | +++ | ++ | +++ | +++. |
| | Mycelium | Dark brown | Yellow | Cream | Cream. |
| | Aerial mycelium and spores | None | Green | Light grey | White. |
| | Sol. pigment | Dark brown | − | − | −. |
| Cellulose agar | Growth veg | + | + | + | ++. |
| | Mycelium | Grey-brown | White | White | Cream. |
| | Aerial mycelium and spores | None | Green | Brownish white | Green. |
| | Sol. pigment | Dark brown | − | − | −. |
| | Cellulose degradat | − | − | − | −. |
| Casein-litmus-agar | Growth veg | +++ | +++ | ++++ | ++++. |
| | Mycelium | Grey brown | Light grey | Cream | Cream. |
| | Aerial mycelium and spores | None | Light grey | Grey | White-light grey. |
| | Litmus-colour | Red K:Z=25:52 | Blue | Blue | Blue. |
| | Casein degradation | +++ K:Z=25:52 | + K:Z=22:28 | ++ K:Z=25:44 | ++ K:Z=25:42. |
| Peptone-agar slant | Melanine pigment | ++++ | − | − | −. |
| Potatoe slice | Growth veg | +++ | ++ | ++++ | +++. |
| | Mycelium | Grey-brown | Yellow-brown | Cream | Golden yellow. |
| | Aerial mycelium and spores | None | None | Grey white | Green. |
| | Sol. pigment | Black | − | − | −. |
| | Sporophore-type | Rectus | Retinaculum apertum (Rectus). | Spira (Monovert-Spira). | Retinaculum apertum. |
| | Spores | Oval, smooth | Oval, hairy | Cylindrical, hairy | Oval, thorny. |

NOTE.—K=diameter of colony in mm.; Z=diameter of zone in mm.

TABLE 3

Antibacterial spectrum of Moenomycin

| Testorganism | |
|---|---|
| Staph. aureus P209 | 0.05–0.3 |
| "resistant to tetracycline | 0.05–0.03 |
| "resistant to streptomycin | 0.05–0.03 |
| "resistant to penicillin | 0.05–0.03 |
| "resistant to novobiocin | 0.05–0.03 |
| "resistant to erythromycin | 0.05–0.3 |
| Streptococcus haemolyticus | 0.05–0.01 |
| Streptococcus viridans | 0.4 |
| Sarcina lutea | 16–32 |
| Corynebact. diphtheriae | 0.1–1.5 |
| Bacillus subtilis | 0.1–0.25 |
| Bacillus cereus | 0.45 |
| Bacillus mesentericus | 0.24 |
| Bacillus mycoides | 3.7 |
| Bacillus anthracis | 0.12 |
| Enterococcus | 0.05–0.1 |
| E. coli | 188–375 |
| Klebs. rhinoskleromatis | 94 |
| Proteus vulgaris | 23–94 |
| Pseudomonas aeroginosa | 94–188 |
| Salm. paratyph. A | 188 |
| Salm. paratyph. B | 188 |
| Salm. pullorum | 77 |
| Shigella flexneri | 47 |
| Pasteurella septica | 35.7 |
| Brucella abortus Bang | 1.2 |
| Brucella melitensis | 4.7 |

TABLE 4

Therapeutic activity of Moenomycin in mice infected with Streptococcus haemolyticus

| Infection: | intraperitoneally |
| Treatment: | 3 doses of Moenomycin immediately, 4 and 20 hours after the infection. |

| Total dose .g/kg | Number of animals | Surviving animals after 2 days | 10 days | |
|---|---|---|---|---|
| 75 | 8 | 8 | 8 | |
| 37.5 | 8 | 8 | 8 | |
| 20 | 8 | 8 | 8 | |
| 10 | 8 | 8 | 8 | |
| 6 | 8 | 8 | 8 | |
| 3 | 4 | 4 | 3 | |
| 0 (control) | 8 | 0 | 0 | |

We claim:

1. An antibiotic characterized by the following properties:
   a. Elemental analysis
      C 48.5 % by weight
      H 7.3 % by weight
      N 5.1 % by weight
      P 1.9 % by weight
      O remainder.
   b. Molecular weight: 68,000 to 70,000.
   c. Infra red spectrum of the sodium salt: Maxima at 2.95, 3.40, 6.00, 6.53, 7.28, 8.20 and 9.38 $\mu$.
   d. Melting point: No definite melting point, decomposition starting at 200° C.
   e. Paper-electrophoresis: No migration in buffer solutions of pH 1.9 and 7.8, anodic migration in buffer solution of pH 9.8.
   f. Solubility: Soluble in water, low molecular weight alcohols and polar solvents.
   g. Ultra-violet spectrum: Maximum at 258 $\mu$, $E_{1\ cm}^{1\ \%} = 60$ (water, pH 7) or physiologically compatible salts thereof.

2. A pharmaceutical composition which comprises an antibacterially effective amount of the antibiotic as defined in claim 1 and a pharmaceutical carrier.

3. A process for producing the antibiotic as defined in claim 1 which comprises cultivating a Streptomyces strain of the group consisting of bambergiensis (ATCC No. 13,879), ghanaensis (ATCC No. 14,672), ederensis (ATCC No. 15,304) and geysiriensis (ATCC No. 15,303) under submerged and aerobic conditions in an aqueous nutrient medium until substantial antibacterial activity is imparted to said medium and thereupon extracting an antibiotic from the resulting mycelium and culture medium.

4. Process of claim 3 wherein the antibiotic is isolated from the mycelium by extraction with an at least partially water-miscible organic solvent.

5. Process of claim 3 wherein the antibiotic-forming strain is Streptomyces bambergiensis (ATCC No. 13,879).

6. Process of claim 3 wherein the antibiotic-forming strain is Streptomyces ghanaensis (ATCC No. 14,672).

7. Process of claim 3 wherein the antibiotic-forming strain is Streptomyces ederensis (ATCC No. 15,304).

8. Process of claim 3 wherein the antibiotic-forming strain is Streptomyces geysiriensis (ATCC No. 15,303).

* * * * *